United States Patent [19]

Monk et al.

[11] Patent Number: 5,309,360
[45] Date of Patent: May 3, 1994

[54] METHOD FOR ATTENUATING UNDESIRABLE DATA, SUCH AS MULTIPLES, USING CONSTRAINED CROSS-EQUALIZATION

[75] Inventors: David J. Monk, Sugarland; Cameron B. Wason, Plano, both of Tex.

[73] Assignee: Halliburton Geophysical Services, Inc., Houston, Tex.

[21] Appl. No.: 704,363

[22] Filed: May 23, 1991

[51] Int. Cl.$^5$ ............................................. G06F 15/21
[52] U.S. Cl. ..................................... 364/420; 364/421
[58] Field of Search ............... 364/420, 421, 572, 574; 367/24, 38, 45

[56] References Cited

U.S. PATENT DOCUMENTS

| | | | |
|---|---|---|---|
| 3,629,800 | 12/1971 | Schneider | 367/45 |
| 4,750,156 | 6/1988 | Abrams et al. | 364/421 |
| 4,887,243 | 12/1989 | Pann | 367/24 |
| 5,010,526 | 4/1991 | Linville et al. | 364/421 |
| 5,051,960 | 9/1991 | Levin | 367/38 |
| 5,067,112 | 11/1991 | Meek et al. | 364/421 |
| 5,132,938 | 7/1992 | Walters | 367/38 |

Primary Examiner—Robert A. Weinhardt
Attorney, Agent, or Firm—Arnold, White & Durkee

[57] ABSTRACT

To eliminate undesirable energy recorded during seismic surveying, a trace that models the undesirable energy on the recorded data trace is prepared. The model trace is first estimated using a suitable technique, such as wavefield extrapolation. Then, the model trace is modified using a best estimate of the amplitude, phase and time delay differences between the model trace and the data trace. The estimated amplitude, phase and time delay differences may be used to design a cross-equalization filter, which is used to cross-equalize the model trace with the data trace. Alternatively, the best estimate determination may include using a weighted sum of the model trace, its imaginary component, and their derivatives. When weighted and summed together, these components form a cross-equalized model trace that closely approximates the undesirable energy on the recorded data trace. Lastly, the cross-equalized model trace is subtracted from the data trace to substantially eliminate the undesirable energy.

25 Claims, 7 Drawing Sheets

METHOD FOR ATTENUATING UNDESIRABLE DATA, SUCH AS MULTIPLES, USING CONSTRAINED CROSS-EQUALIZATION

BACKGROUND OF THE INVENTION

1. Field of the Invention

The present invention relates generally to marine seismic exploration and, more particularly, to a technique for achieving multiple attenuation on marine seismic data.

2. Description of the Related Art

In marine seismic exploration, a seismic survey ship is equipped with an energy source and a receiver for taking seismic profiles of an underwater land configuration. The act of taking profiles is often referred to as "shooting" because explosive devices have been commonly used for many years as energy sources. The energy source is designed to produce compressional waves, commonly referred to as "primary" waves, that propagate through the water and into the underwater land formation. As the compressional waves propagate through the land formation, they strike interfaces between the formations, commonly referred to as "strata," and reflect back through the earth and water to the receiver. The receiver typically converts the reflected waves into electrical signals which are then processed into an image that provides information about the structure of the subterranean formation.

Presently, one of the most common energy sources is an airgun that discharges air under very high pressure into the water. The discharged air forms a pulse which contains frequencies within the seismic range.

The receivers in marine applications are typically referred to as hydrophones. The hydrophones convert pressure waves into electrical signals which are used for analog or digital processing. Most commonly, hydrophones include a piezoelectric element for converting the pressure waves into electrical signals. The hydrophones are mounted on a long streamer which is towed behind the survey ship at a depth of about 30 ft. It is not uncommon for the streamer to be several miles long and to carry receivers every few feet in a regularly spaced pattern.

As previously mentioned, each time the energy source imparts a seismic pulse into the water, the compressional waves propagate through the land formation, strike strata, and reflect back through the earth and water to the receivers. Each receiver detects the reflected wave, and delivers an electrical signal to a recording device aboard the survey ship. Each recorded signal from a receiver is commonly referred to as a "trace." Thus, for each seismic pulse generated, many traces may be recorded.

The wave that is reflected off of the strata and detected by the receivers is commonly referred to as a "primary reflection." Unfortunately, the receivers detect pressure waves other than the primary reflection. For instance, a problem encountered in marine seismic surveying is that of water column reverberation. This problem arises as a result of the inherent reflectivity of the water surface and the water bottom. After the primary reflection travels upwardly past the receiver, the wave continues upward to the water's surface. The primary reflection reflects off of the air-water interface and begins to travel downwardly toward the water bottom where it is again reflected. Thus, this multiply reflected wave, often referred to as a water bottom multiple, travels past the receivers again. The receivers detect this reflection and the reflection is recorded on the traces. Depending upon the nature of the earth's material at the water bottom, the multiple may itself be reflected again, and give rise to a series of one or more subsequent multiple reflections.

This reverberation of the seismic wave field in the water obscures seismic data, amplifying certain frequencies and attenuating others, thereby making it difficult to analyze the underlying earth formations. When the earth material at the water bottom is particularly hard, most of the acoustic energy generated by the seismic source can become trapped in the water column. As a result, the multiple energy tends to cover the weaker primary seismic reflection signals sought for study.

In an effort to isolate the data produced by the primary reflections from the data produced by reverberation and other noise sources, engineers model the undesirable data produced by multiple reflections for each data trace. Theoretically, the model of the undesirable data can be subtracted from the recorded data trace to yield a clean data trace that contains only the data produced by the primary wave.

However, the current modeling techniques cannot achieve this theoretical result. In one technique, an initial estimate of the undesirable data is formed using a wave field extrapolation technique. See J. Claerbout, *Imaging the Earth's Interior* (1985). Wave field extrapolation is often used to build the model trace, but the model so constructed may be in error for the following reasons:

(1) the velocity of sound in the multiple generating layer is not accurately known;

(2) the thickness o the multiple-reflection generating layer is not accurately known;

(3) the magnitude of the reflection coefficients at the reflection boundaries may not be well known; and (4) the reflection boundaries may not be single interfaces.

These problems result in a distorted model. Therefore, the model trace is processed to provide a closer approximation to the recorded data trace. Conventionally, this has been achieved using cross-equalization of the model to the real data. Cross-equalization involves the determination of a filter, which, when applied, will make one seismic trace look like another. This method works well, but exhibits an intrinsic problem. If multiple-reflection energy lies directly on top of primary energy on the recorded data trace, i.e., the receiver detected the multiple wave and the primary reflection at the same time, then the cross-equalization filter will force the model of the multiple-reflection energy to look like the primary and multiple energy on the recorded data trace. Thus, cross-equalization filters treat desirable primary reflection data as undesirable multiple-reflection data, and subsequent subtraction of the cross-equalized model from the recorded data trace will attenuate the primary energy.

The present invention is directed to overcoming, or at least minimizing, one or more of the problems set forth above.

SUMMARY OF THE INVENTION

In accordance with one aspect of the present invention, there is provided a method of cross-equalizing a model trace and a recorded data trace. Each of the traces have respective amplitude, phase and time characteristics. The method includes the steps of: determining a ratio of the amplitude of the recorded data trace and the amplitude of the model trace; determining a phase difference between the phase of the recorded data trace and the phase of the model trace; and determining a time delay between the time characteristic of the recorded data trace and the time characteristic of the model trace. Once these parameters are determined, a constrained filter is designed using the amplitude ratio, phase difference and time delay. Then, the model trace is filtered by the constrained filter to produce a cross-equalized model trace.

Alternatively, in accordance with another aspect of the present invention, the method of cross-equalizing a model trace and a recorded data trace need not require the creation of a constrained cross-equalization filter. The recorded data trace can be represented as a sum of: a real component of the model trace, an imaginary component of the model trace, a derivative component of the real component of the model trace, and a derivative component of the imaginary component of the model trace. Each of the summed components is weighted by a respective weighting factor which embodies the amplitude ratio, phase difference and time delay between the model trace and the recorded data trace. Therefore, solving for each of the weighting factors determines the amplitude ratio, phase difference and time delay.

Preferably, the parameters are determined by first transforming the model trace and real data trace into the frequency domain; the weighting factors embodying amplitude, phase and time differences between the model trace and the recorded data trace can be determined in frequency domain and a new model trace frequency spectrum constructed.

Since the components have been determined, solving for each of the weighting factors produces a cross-equalized model trace. Then, regardless of which constrained method is used to design the cross-equalized model trace, the cross-equalized model trace is subtracted from the recorded data trace to produce a data trace that is substantially free from undesirable data, such as recorded energy from multiple reflections.

BRIEF DESCRIPTION OF THE DRAWINGS

The foregoing and other advantages of the invention will become apparent upon reading the following detailed description and upon reference to the drawings in which.

Figure 1:
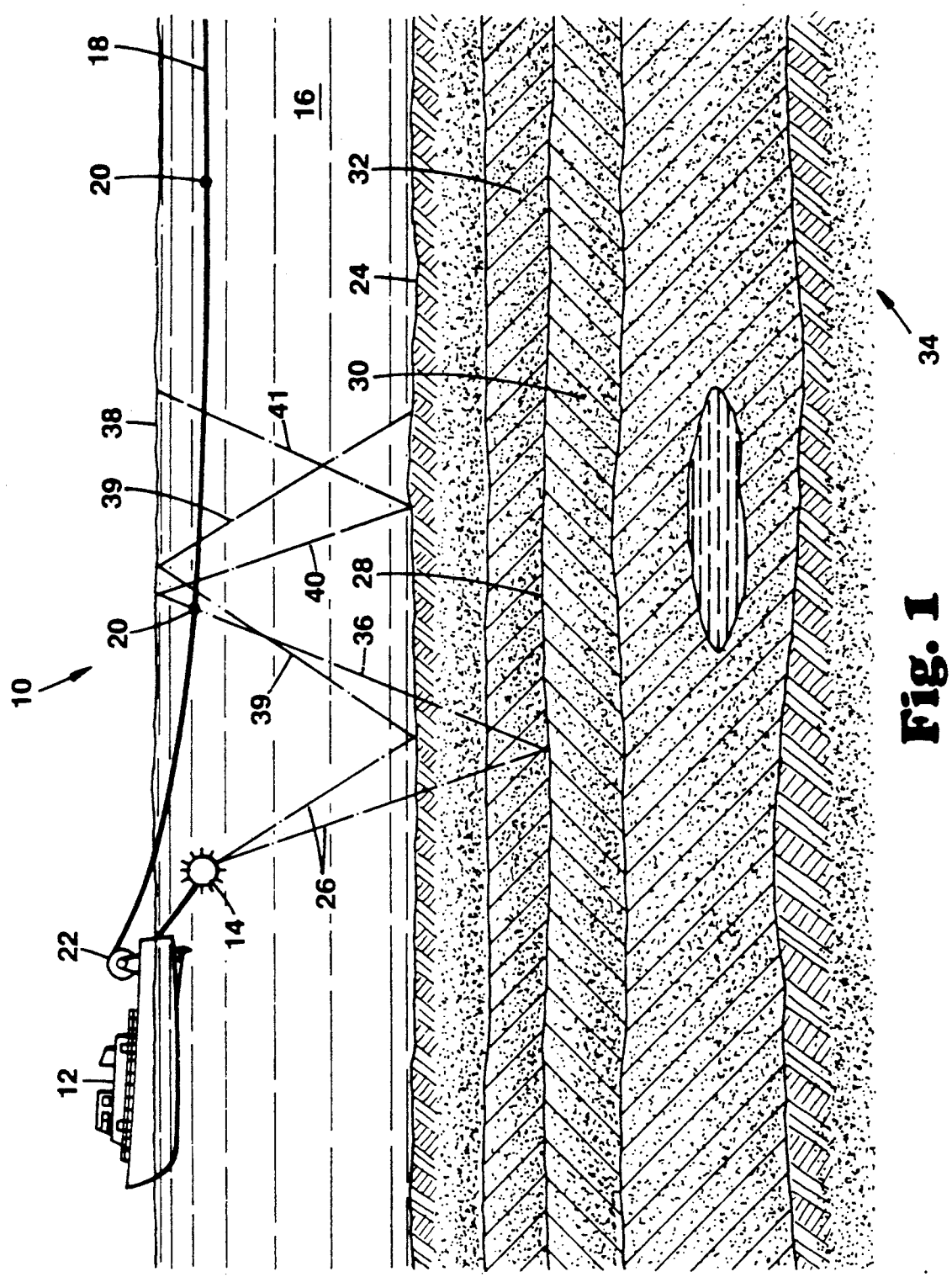
FIG. 1 illustrates a marine seismic survey system and multiple reverberated waves produced by the system.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Turning now to the drawings and referring initially to FIG. 1, a preferred marine seismic survey system is illustrated and generally designated by a reference numeral 10. The system 10 includes a seismic survey ship 12 that is adapted for towing a seismic energy source 14 through a body of water 16. The seismic energy source 14 is an acoustic energy source or an array of such sources. The energy source 14 generates seismic pulses that propagate into the water 16. The energy source 14 is constructed and operated in a manner conventional in the art. An acoustic energy source 14 preferred for use with the system 10 is an array of compressed air guns called "sleeve guns" which are commercially available from Halliburton Geophysical Services, Inc. of Houston, Tex.

The system 10 also includes a streamer 18 that is towed behind the survey ship 12. The streamer 18 contains a plurality of receivers 20 that are arranged in a spaced relationship along the length of the streamer 18. Typically, the receivers 20 are hydrophones, although the receivers 20 may also take the form of a hydrophone/geophone pair. The receivers 20 detect energy imparted to the water 16 by the energy source 14. The depth of the streamer 20 is controlled by a plurality of depth controllers (not shown) which are clamped over the streamer 18. When in use, the streamer 18 extends between a ship-board reel 22 and a buoy (not shown). Visual or radar sighting on the buoy is used to determine the amount of drift of the streamer 18, and is also used to locate the streamer 18 in case of accidental breakage. When not in use, the streamer 18 is stored on the ship-board reel 22. It should also be appreciated that while the system 10 is shown to include a survey ship 12 that tows both an energy source 14 and a streamer 18, the streamer 18 could be towed from a vessel other than that which tows the seismic source, or could take the form of a stationary cable lying near or on the water bottom 24 for bottom-cable operations, without departing from the scope of the invention.

During data collection, seismic waves generated by the energy source 14 travel downwardly, as indicated by the rays 26, and are typically referred to as primary waves. These primary waves are reflected off of interfaces between strata, such as the interface 28 between strata 30 and 32 in the subterranean earth formation 34. The reflected waves travel upwardly, as illustrated by the ray 36, and are typically referred to as primary reflections. As the primary reflections impinge upon the receivers 20, the receivers 20 generate electrical signals representative of pressure changes inherent to the wave field, and transmit these electrical signals back to the survey ship 12 via the streamer 18.

Recording equipment within the survey ship 12 selectively amplifies, conditions, and records these time-varying electrical signals so that they can be subsequently processed to map the subterranean earth formation 34. Advantageously, the system also digitizes the received signals, using a 14 bit analog-to-digital converter for instance, to facilitate signal analysis. Preferably, the ship 12 utilizes a multi-channel seismic recording system which is commercially available from Halliburton Geophysical Services, Inc. However, those skilled in the art will recognize that any one of a variety of seismic recording systems can be used.

Each receiver 20 transmits its own electrical signal which is received by a corresponding channel on the recording system. The record of a receiver's response to a seismic impulse is commonly referred to as a "trace." Thus, every time the energy source 14 fires, each receiver 20 detects the reflected energy and transmits an electrical signal to the recording system. The recording system records one trace for each electrical signal received. These signals are typically referred to as reflection data.

The receivers 20 not only detect the primary reflections of interest, but also reverberated or multiple-reflected waves. Reverberated waves are primary reflected waves that reflect off of the water-air interface at the surface 38 of the water 16 and travel downwardly again in the water 16 to impinge on the water bottom 24 and then travel back up to the receivers 20. For instance, as illustrated in FIG. 1, upon striking the water-air interface at the surface 38, most of the energy in the primary reflection 36 is reflected back toward the water bottom 24, as indicated by the ray 40. This reflection results in a second upwardly traveling set of reflected waves illustrated by the ray 41, which are commonly referred to as "multiples." These multiple waves 41 once again pass through the area occupied by the streamer 18, causing the receivers 20 to generate a further set of electrical signals. A significant portion of the energy of the multiple waves 41 striking the water surface 38 may once again be reflected downwardly, creating further multiple wave fields (not shown). Additionally, much energy generated by the source 14 may be initially reflected off of the water bottom 24, travel upwardly to the surface 38, and reflect downwardly as shown by the rays 39. These multiple wave fields will also be detected by the receivers 20, and produce undesirable data on the recorded traces.

Figure 2:
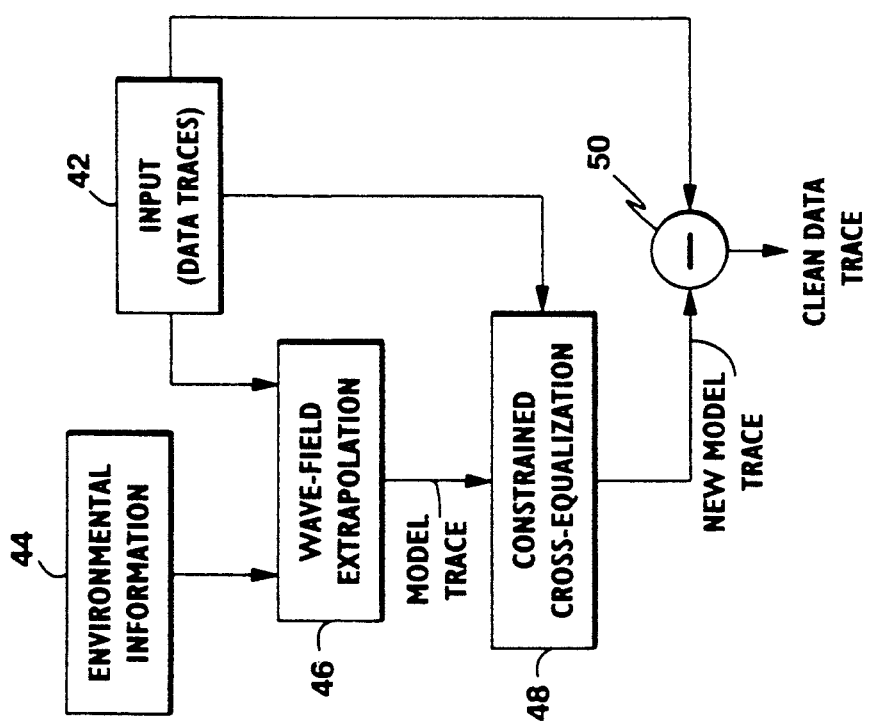
FIG. 2 diagrammatically illustrates a process for removing undesirable data from a recorded data trace in accordance with the present invention.

To remove the effects of the multiple waves from the recorded data, a model of the multiple waves on each recorded data trace is produced and, then, subtracted from the recorded data trace, as illustrated by the block diagram in FIG. 2. In block 46, an initial estimate of the recorded multiple reflection energy on each seismic trace is formed using any suitable technique, but preferably using a wave field extrapolation technique. The wave field extrapolation technique generates a model of the undesirable data on a recorded data trace using (1) the recorded data trace, (2) the shape of the water bottom 24, (3) the thickness of the water layer, and (4) the velocity of the waves traveling in the water 16. As illustrated in FIG. 2, the environmental information from block 44 is used to extrapolate a recorded data trace from block 42 to create a model trace for each data trace. Several wave field extrapolation techniques are well known in the art. See, e.g., J. R. Berryhill & Y. C. Kim, *Geophysics*, Vol. 51, No. 12, p. 2/77, December 1986. However, it should be understood that a model produced by this technique will be no more than an estimate due to the difficulty in ascertaining the information in (2)–(4) above, and uncertainty about reflection coefficients at reflecting boundaries.

It is desirable to cross-equalize the model trace to the data trace because (1) the wave equation extrapolation is essentially a dip dependent time delay and does not account for the reflection coefficient at the water bottom or surface, so the amplitude of the model trace may be adjusted to account for this reflection coefficient; (2) the water bottom reflection may also involve some phase shifting of the wavelet transmitted by the energy source 1 which is not compensated by the wave field extrapolation technique; and (3) as previously mentioned, there may be slight errors in the environmental information which may result in a time shift.

Therefore, to ensure that the model trace constructed using the wave field extrapolation technique of block 46 closely approximates the multiple reflection energy present 15 in the recorded data trace, the model trace is cross-equalized to its corresponding data trace using a constrained cross-equalization technique in block 48. After the constrained cross-equalization, the cross-equalized model trace closely approximates the multiple reflection energy present in its corresponding data trace. Then, in block 50, the cross-equalized model trace is subtracted from its corresponding data trace to yield a seismic data trace having its multiple reflection energy attenuated without having its primary reflection energy disturbed.

The degree to which the model trace constructed using the wave field extrapolation technique of block 46 approximates the multiple reflection energy present on the recorded data trace may vary with each multiple bounce and from trace to trace. Therefore, it is desirable to time gate each model trace and real data trace so that multiples from different bounces are examined separately. Cross-equalization of the model data to the real data then takes place on a trace by trace, gate by gate basis.

The operation of the constrained cross-equalization technique will now be described in detail by reference to FIG. 3 and to the following equations. First, the survey ship 12 shoots and records seismic data, as mentioned in blocks 54 and 56, respectively. Then, model traces are formed using the wave field extrapolation technique, as mentioned in block 58. In view of the problems associated with the wave field extrapolation technique mentioned above, the amplitude, phase, and time constituents of the model trace may need to be adjusted to match the associated data trace. The constrained cross-equalization technique provides these adjustments.

Figure 3:
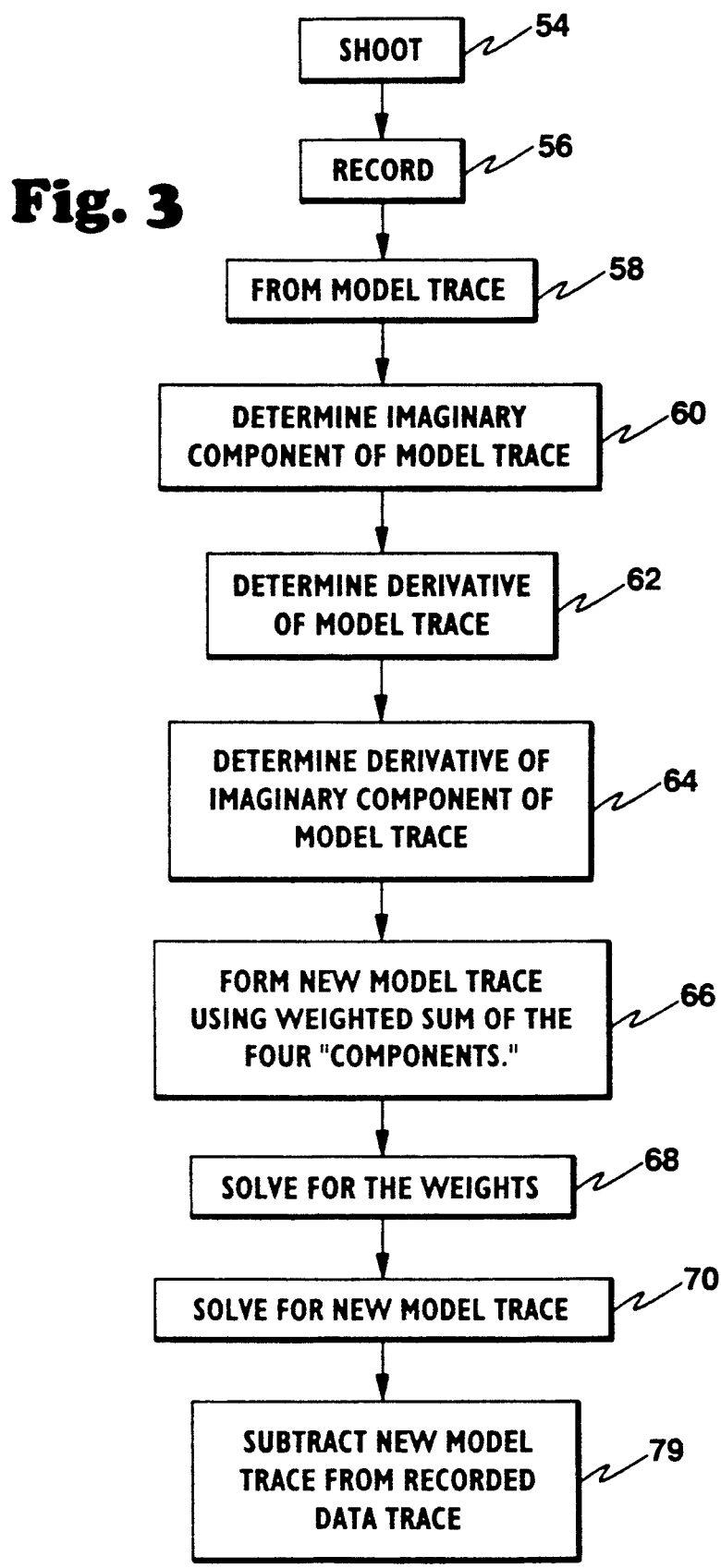
FIG. 3 illustrates detailed flowchart describing a process for removing undesirable data from a recorded data trace in accordance with the present invention.

However, before explaining the constrained cross-equalization technique as set forth in blocks 60–70 of FIG. 3, some assumptions are made. First, it is assumed that the amplitude and phase adjustments are frequency independent, i.e., the reflection coefficient does not have any amplitude or phase dependence on frequency. Second, it is assumed that the reflection coefficient is not dip dependent, though it would be possible to pursue a result in "P" space which would allow for dip dependent reflection coefficients. In addition to the assumptions that the amplitude, phase, and time components of the model trace are shifted with respect to the data trace, the noise components of the two traces may also be different.

Once the amplitude, phase and time differences between the model trace and the recorded data trace are determined, the model trace can be cross-equalized with respect to the recorded data trace. For instance, the amplitude, phase and time differences may be used to design a constrained cross-equalization filter. This filter can then be applied to the model trace in much the same manner as a conventional cross-equalization filter. As another example, the amplitude, phase and time differences may be used to calculate a cross-equalized model trace directly. Both of these techniques will be explained in detail herein. Regardless of which technique is used, it should be understood that by adjusting only the amplitude, phase and time characteristics of the model trace to match these characteristics of the multiples recorded on the actual data trace, the primary energy recorded on the data trace will not be attenuated as it would if a conventional cross-equalization filter were used.

First, the model trace may be mathematically represented in the frequency domain, as shown in equation 1.

$$M(t) = \int A(\omega) \exp(i\omega t) \quad (1)$$

where A is amplitude and $\omega$ is frequency.

If the wavelet on the data trace is different from the model trace by an amplitude scaler, a phase rotation and a time delay, we can define the data trace as follows:

$$D(t) = B \int d\omega A(\omega) \exp i\, (\omega(t+\tau)+b) \quad (2)$$

where B equals the amplitude scaler, and b equals the constant phase rotation and $\tau$ equals the time delay. Therefore, the data trace can be expressed as follows:

$$\begin{aligned} D(t) &= B \int d\omega\, A(\omega)\, \exp\, i(\omega(t+\tau))\, (\cos(b) + i \sin(b)) \quad (3) \\ &= B\, M(t+\tau) \cos(b) + B\, \hat{M}(t+\tau) \sin(b) \quad (4) \end{aligned}$$

where $\hat{M}(t)$ represents the Hilbert transform of M(t) in accordance with block 60.

If the time shift $\tau$ is small, equation 4 can be expanded using a Taylor series expansion and limited to the first two terms to obtain equation 5.

$$D(t) = W_1 M(t) + W_2 M'(t) + W_3 \hat{M}(t) + W_4 \hat{M}'(t); \quad (6)$$

where M(t) is the model trace calculated as a result of the wave field extrapolation, $\hat{M}(t)$ is the Hilbert transform of the model trace, M'(t) is the derivative of the model trace, and $\hat{M}'(t)$ is the derivative of the Hilbert transform trace. In other words, and in accordance with blocks 62 and 64, respectively, the derivative of the model trace M'(t) and the derivative of the imaginary component of the model trace $\hat{M}'(t)$ are determined.

Equation 5 may be written so that the cross-equalized model trace D(t), which is essentially equal to the undesirable data on the data trace, may be calculated as the weighted sum of four separate traces, as set forth in block 66 and as shown in equation 6.

$$D(t) = W_1 M(t) + W_2 M'(t) + W_3 \hat{M}(t) + W_4 \hat{M}'(t); \quad (6)$$

where:

$W_1 = B\cos(b); \quad (7)$ $W_2 = \tau B\cos(b); \quad (8)$ $W_3 = B \sin(b); \quad (9)$ and $W_4 = \tau B \sin(b). \quad (10)$ The weight $W_1$, $W_2$, $W_3$, and $W_4$ attributable to each of the traces is determined, as set forth in block 68. It should be noticed that weights $W_1$, $W_2$, $W_3$, and $W_4$ adjust the amplitude, phase and time of the model trace M(t). Thus, a cross-equalized model trace can be created, as indicated by equation 6, once the weights $W_1$, $W_2$, $W_3$, and $W_4$ have been derived if the trace components as set forth in equation 6 have been determined.

However, the weights can be computed without resorting to actually calculating the four traces themselves. Once computed, the amplitude B, phase b and time delay $\tau$ can be used to design a constrained cross-equalization filter represented by $B\, e^{-j(\omega\tau+b)}$. While there are various ways to compute the amplitude B, phase b and time delay $\tau$, these parameters are preferably calculated in accordance with the representation of equation 6 and determined as set forth below. Thus, even if one chooses not to directly determine the constrained cross-equalized model trace using equation 6, equation 6 may nevertheless be a useful representation to facilitate the determination of the amplitude B, phase b and time delay $\tau$.

The problem may be expressed in matrix terms as shown in equation 11 below:

$$\begin{bmatrix} M(t) & M'(t) & \hat{M}(t) & \hat{M}'(t) \\ \downarrow & \downarrow & \downarrow & \downarrow \end{bmatrix} \begin{bmatrix} W_1 \\ W_2 \\ W_3 \\ W_4 \end{bmatrix} = \begin{bmatrix} D(t) \\ \downarrow \end{bmatrix} \quad (11)$$

or M · W = D, where M is the model trace matrix, W is the weight matrix, and D is the data trace matrix. Matrix M is a j×4 matrix, matrix W is a 4×1 matrix, and matrix D is a j×1 matrix, where j is equal to the number of samples that comprise a trace. For example, if a trace is 6 seconds long and is sampled once every 4 milliseconds, then j=1501.

Therefore, equation 11 may be expressed as shown below in equation 12.

$$\begin{bmatrix} M(1) & M'(1) & \hat{M}(1) & \hat{M}'(1) \\ M(2) & M'(2) & \hat{M}(2) & \hat{M}'(2) \\ M(3) & M'(3) & \hat{M}(3) & \hat{M}'(3) \\ M(4) & M'(4) & \hat{M}(4) & \hat{M}'(4) \\ \vdots & \vdots & \vdots & \vdots \\ M(j) & M'(j) & \hat{M}(j) & \hat{M}'(j) \end{bmatrix} \begin{bmatrix} W_1 \\ W_2 \\ W_3 \\ W_4 \end{bmatrix} = \begin{bmatrix} D(1) \\ D(2) \\ D(3) \\ D(4) \\ \vdots \\ D(j) \end{bmatrix} \quad (12)$$

To transform the matrix M into a matrix having a more manageable size, the matrix M is multiplied by its transpose $M^T$, as shown in equations 13 and 14 below:

$M^T M\, W = M^T D; \text{ or} \quad (13)$ $A\, W = E; \quad (14)$ where $A = M^S M$ and $E = M^T D$. Thus, atrix A is a 4×4 matrix, matrix W is a 4×1 matrix and matrix E is a 4×1 matrix. Matrix A is set forth below.

$$A = \begin{bmatrix} a_0 & a_1 & a_2 & a_3 \\ a_1 & a_4 & a_5 & a_6 \\ a_2 & a_5 & a_7 & a_8 \\ a_3 & a_6 & a_8 & a_9 \end{bmatrix}$$

where $$a_0 = \sum_{t=0}^{NT} M(t)M(t); \quad a_1 = \sum_{t=0}^{NT} M(t) \cdot M'(t);$$

$$a_2 = \sum_{t=0}^{NT} M(t) \cdot \hat{M}(t); \quad a_3 = \sum_{t=0}^{NT} M(t) \cdot \hat{M}'(t);$$

$$a_4 = \sum_{t=0}^{NT} M'(t) \cdot M'(t); \quad a_5 = \sum_{t=0}^{NT} M'(t) \cdot \hat{M}(t);$$

$$a_6 = \sum_{t=0}^{NT} M'(t) \cdot M'(t); \quad a_7 = \sum_{t=0}^{NT} \hat{M}(t) \cdot \hat{M}(t);$$

$$a_8 = \sum_{t=0}^{NT} M(t) \cdot \hat{M}'(t); \text{ and } a_9 = \sum_{t=0}^{NT} \hat{M}'(t) \cdot \hat{M}'(t);$$

where NT is the number of time samples in each table. It should be noted that the elements of matrix A are the zero lag values of the cross-correlations or autocorrelations of the traces. For example, $a_0$ is the zero lag value of the mode ltrace auto-correlation, and $a_1$ is the zero lag value of cross-correlation between the model trace and the derivative trace.

Moreover, several of the elements of matrix A are dot products between a series of sine and cosine terms, such as elements $a_1$, $a_2$, $a_6$, and $a_8$. Thus, these terms are equal to zero, so the matrix A may be represented as shown below.

$$A = \begin{bmatrix} a_0 & 0 & 0 & a_3 \\ 0 & a_4 & a_5 & 0 \\ 0 & a_5 & a_7 & 0 \\ a_3 & 0 & 0 & a_9 \end{bmatrix}$$

The matrix A may be further simplified by noting that $a_7$ is the zero lag value of the zuto-correlation of the imaginary trace. Since the real and imaginary traces have the same amplitude spectrum, it follows that they have the same auto-correlation. Therefore, $a_7 = a_0$ and, similarly, $a_8 = a_4$. It should also be noted that $a_5$ is a zero lag of the cross-correlation of the imaginary trace and the derivative of the model trace. Since $d/dt$ ($\hat{M}(t)^* M(t)$) = $\hat{M}(t)^* M'(t) + \hat{M}'(t)^* M(t) = 0$ and $\hat{M}(t)^* M(t) = 0$, then $\hat{M}(t)^* M'(t) = -\hat{M}'(t)^* M(t)$, and $a_5 = -a_3$. Thus, matrix A finally reduces to:

$$A = \begin{bmatrix} a_0 & 0 & 0 & a_3 \\ 0 & a_4 & -a_3 & 0 \\ 0 & -a_3 & a_0 & 0 \\ a_3 & 0 & 0 & a_4 \end{bmatrix} \quad (17)$$

In this form, the matrix A can be expressed as two separate 2×2 matrices, as follows:

$$\begin{bmatrix} a_0 & a_3 \\ a_3 & a_4 \end{bmatrix} \cdot \begin{bmatrix} W_1 \\ W_4 \end{bmatrix} = \begin{bmatrix} E(1) \\ E(4) \end{bmatrix} \quad (18)$$

$$\begin{bmatrix} a_4 & -a_3 \\ -a_3 & a_0 \end{bmatrix} \cdot \begin{bmatrix} W_2 \\ W_3 \end{bmatrix} = \begin{bmatrix} E(2) \\ E(4) \end{bmatrix} \quad (19)$$

Calculation of the elements $a_0$, $a_3$, and $a_4$ and, thus, $W_1$, $W_2$, $W_3$, and $W_4$ can be directly, using the calculated component traces, but preferably, the calculation of the elements $a_0$, $a_3$, $a_4$, and $E(i)$ is made in the frequency domain without having to resort to actual generation of the individual traces.

The zero lag value of the cross-correlation between two traces is:

$$g(t) \cdot h(t) = \omega(a+ib)\exp(i\omega t)(c-id)\exp(i\omega t); \quad (20)$$

When the real part is evaluated at t=0:

$$= \int ac + bd; \quad (21)$$

where a and c are the real parts of the frequency domain representation of the traces, and b and d are the imaginary parts of the frequency domain representation of the traces. If g(t) equals h(t), for example in calculation of $a_0$, then equation 21 reduces to:

$$= \int aa + bb = \int P(\omega) \quad (22)$$

Having this information, the matrix equations 18 and 19 may be solved. Once the weights W are found, they can be used, if required, to determine the actual values of amplitude, phase, and time differences between the model and data traces. A constrained cross-equalization filter designed with these parameters could be applied in the time domain or the frequency domain to produce a cross-equalized model trace. Alternatively, the weights can be used directly in the trace summation of equation 6 to produce a cross-equalized model trace.

It should also be noted that the following frequency domain representations exist between the various traces:

$$M(t) = \int M(f)\exp(i\omega t) = \int a + ib; \quad (23)$$

$$M^1(t) = i\int \omega M(f)\exp(i\omega t) = \int \omega(-b+ia); \quad (24)$$

$$\hat{M}(t) = i\int \omega M(f) \exp(i\omega t) = \int -b + ia; \text{ and} \quad (25)$$

$$\hat{M}'(t) = -\int \omega M(f)\exp(i\omega t) = -\int \omega(a+ib). \quad (26)$$

Therefore, as set forth in block 70, the frequency domain representation of the matched trace is expressed as:

$$D(t) = W_1 a - \omega W_2 b - W_3 b - \omega W_4 a + i(W_1 b + \omega W_2 a + W_3 a - \omega W_4 b). \quad (27)$$

Where a and b are the real and imaginary parts of the model trace, respectively. Equation 27 can also be expressed as set forth in equation 28.

$$D(t) = a(W_1 - \omega W_4 + i\omega W_2 + iW_3) + b(-\omega W_2 - W_3 + iW_1 - i\omega W_4) \quad (28)$$

This new model trace defined by equation 27 can be subtracted from its corresponding data trace to remove the effects of the undesirable recorded data and, thus, to produce a clean data trace, as set forth in block 79.

In addition, as mentioned previously, it may be desirable to time gate the model trace before cross-equalization. In this situation, the model trace would be divided into several time gated portions after it is formed in block 58. Thus, the steps shown in blocks 62, 64, 66, 68, 70 and 79 would be performed on only one of the time gated portions of the model trace. Then, the steps would be repeated for each of the remaining time gated portions.

Subtraction of the new model trace from the data trace can be performed directly in time domain or can be accomplished by subtracting real and imaginary components in the frequency domain prior to inverse transforming to obtain a final trace in time domain.

Figure 4:
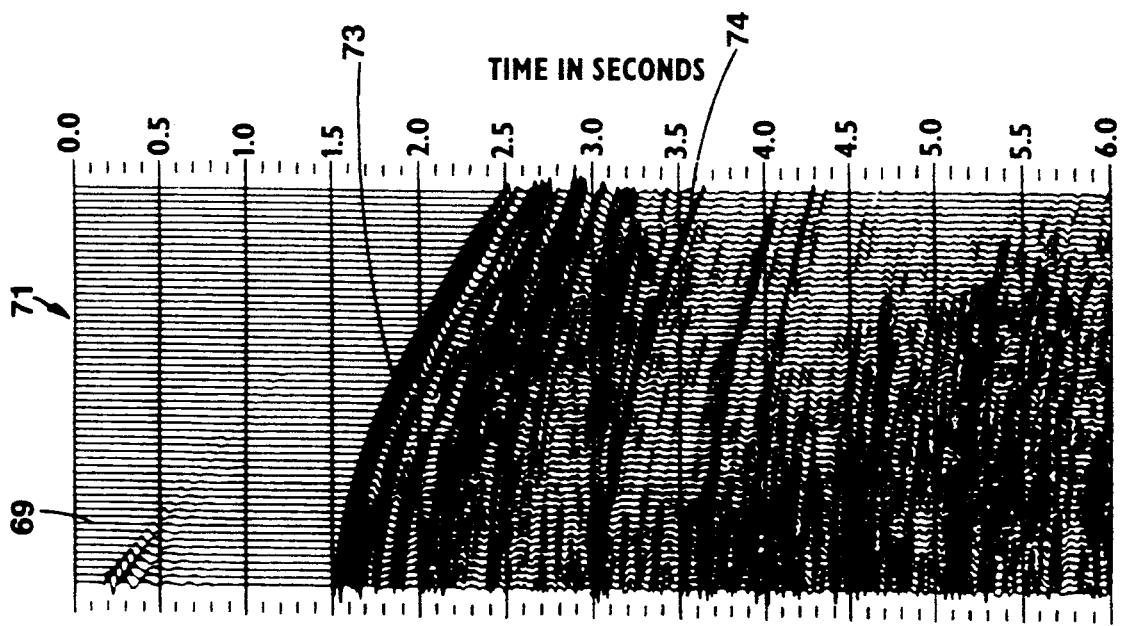
FIG. 4 illustrates a common depth point (CDP) gather of recorded data traces.

The effectiveness of the constrained cross-equalization technique is illustrated by reference to FIGS. 4–9. FIG. 4 illustrates recorded data traces in a common depth point (CDP) pre-stack gather 71. A CDP pre-stack gather displays data for the same reflecting point. This gather is useful for checking corrections and evaluating the components of the stack. Each of the illustrated data traces 69 corresponds to the signal delivered from a respective receiver 20. Since receivers 20 closer to the survey ship 12 receive pressure waves before receivers further from the survey ship 12, similar events recorded by different receivers 20 appear at different times on the gather 71.

Figure 5:
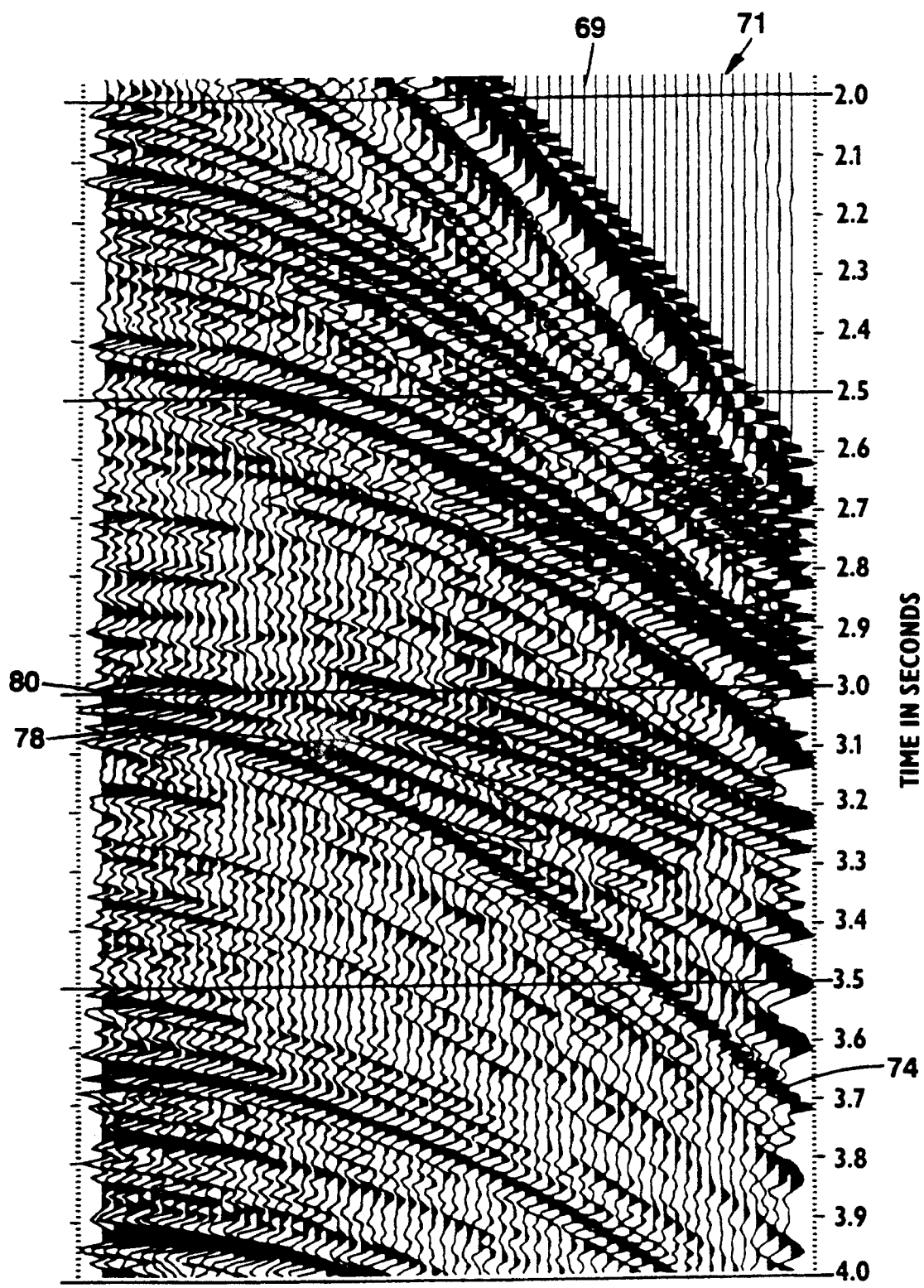
FIG. 5 illustrates a portion of the gather of FIG. 4.

In this example, vertical travel time in the water layer 16 is about 1.5 seconds. Thus, a strong primary reflection 73 was recorded at about 1.5 seconds from the nearest receivers and at about 2.5 seconds from the farthest receivers. Other primary reflections 78 and 80 also appear on the gather 71. Moreover, FIG. 4 illustrates a very strong water-bottom multiple 74 at about 3 seconds for the nearest receivers to about 3.6 seconds for the farthest receivers. FIG. 5 is an enlarged section of FIG. 4 which illustrates the water-bottom multiple 74 in greater detail.

Figure 6:
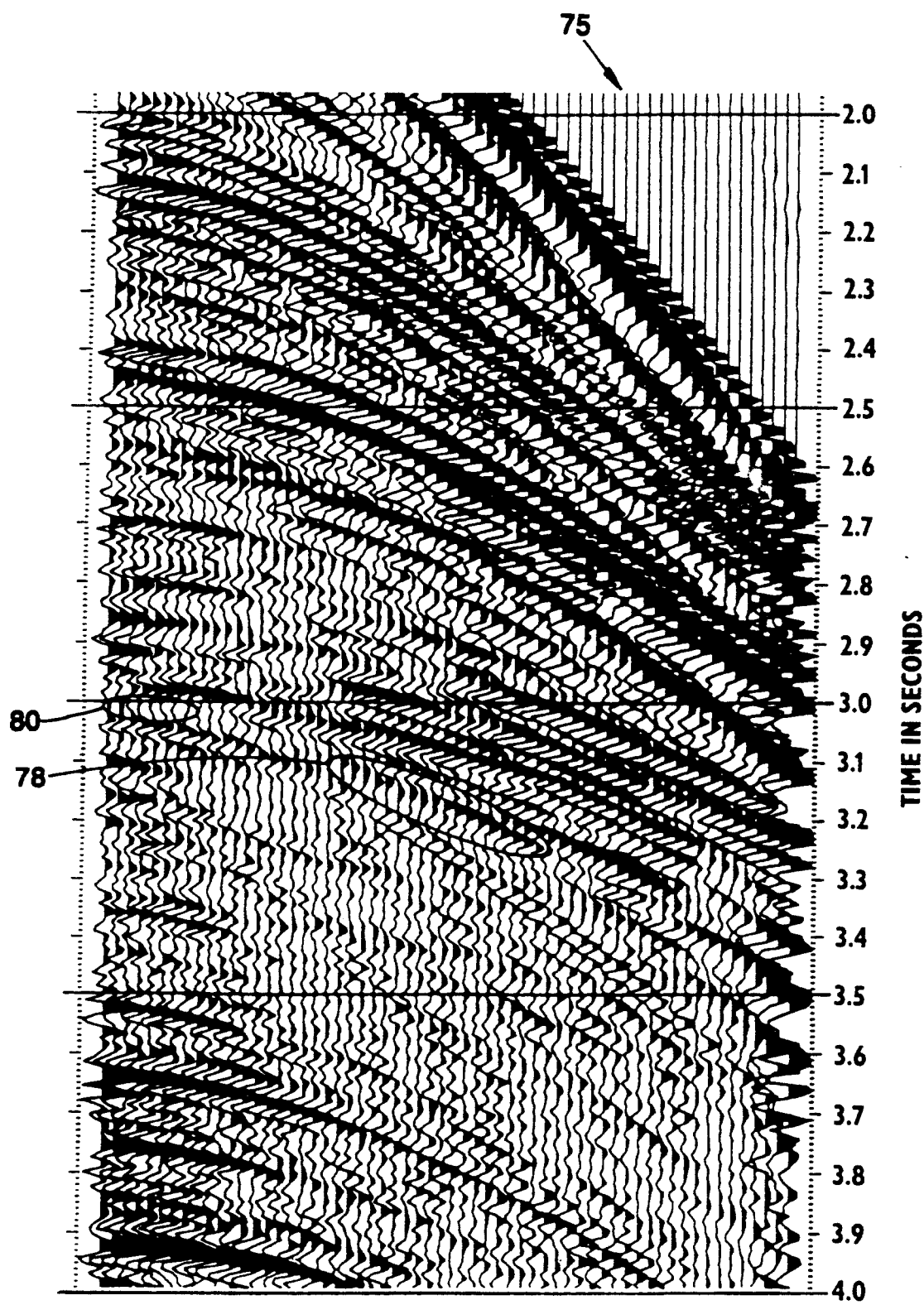
FIG. 6 illustrates a portion of the gather of FIG. 4 after subtracting conventional cross-equalized model traces from the recorded data.

As discussed previously, with regard to the currently disclosed technique and others, it is desirable to form a model of this multiple energy and to subtract the model from the data traces in order to remove the undesirable recorded energy before processing. Before discussing the effects of the constrained cross-equalization technique, it is helpful to illustrate a pre-stack gather of data traces that have been processed using a conventional cross-equalization filter. FIG. 6 illustrates such a pre-stack gather 75. It should be noticed that the multiple energy 74 has been removed from the gather 75. However, it should also be noticed that primary energy in the vicinity of the multiple energy 74 has also been eliminated or severely attenuated by the conventional cross-equalization process. For instance, the primary reflections 78 and 80 exhibit substantial attenuation in the gather 75.

Figure 7:
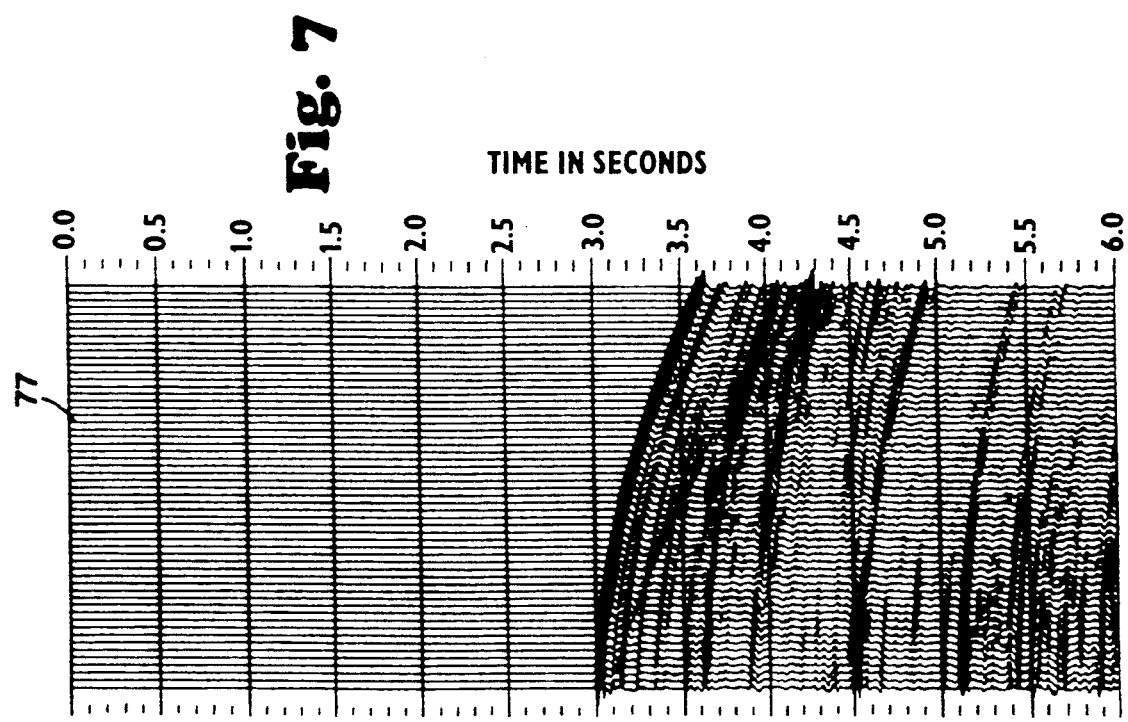
FIG. 7 illustrates a gather of model traces produced by the constrained cross-equalization process disclosed herein in accordance with the present invention.

By contrast, the constrained cross-equalization technique described herein eliminates virtually all of the multiple energy from the data traces while leaving the desired primary energy substantially untouched. FIG. 7 illustrates model traces 77 after undergoing the constrained cross-equalization. Subtracting the model traces of FIG. 7 from the data traces of FIG. 4 results in the clean data trace gather 81 illustrated in FIG. 8.

Figure 8:
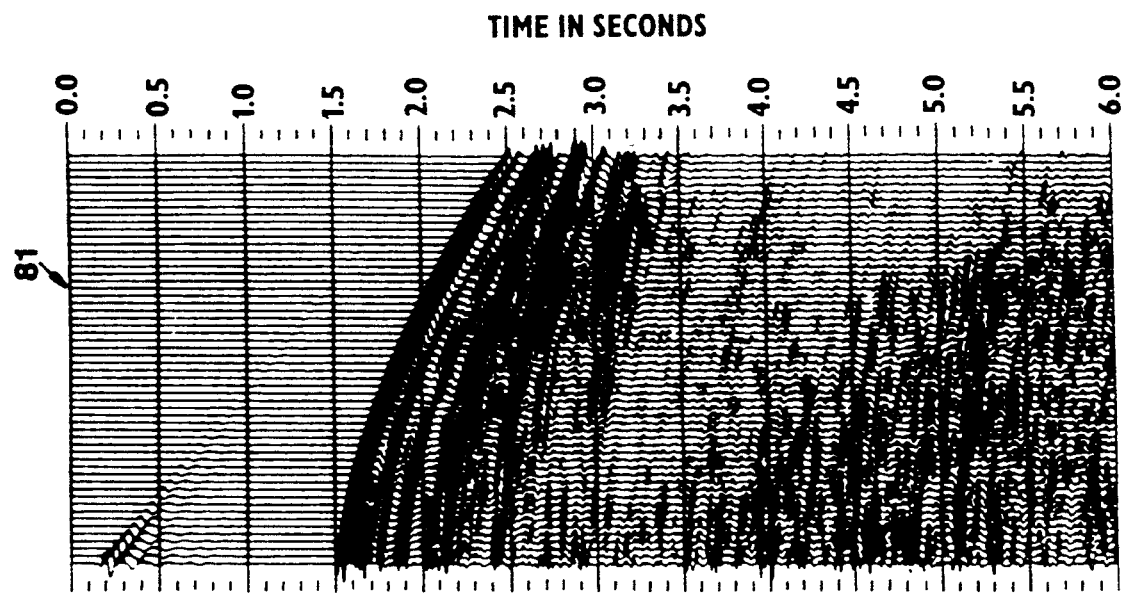
FIG. 8 illustrates a gather of data traces after subtracting the model traces of FIG. 7 from the data traces of FIG. 4.
Figure 9:
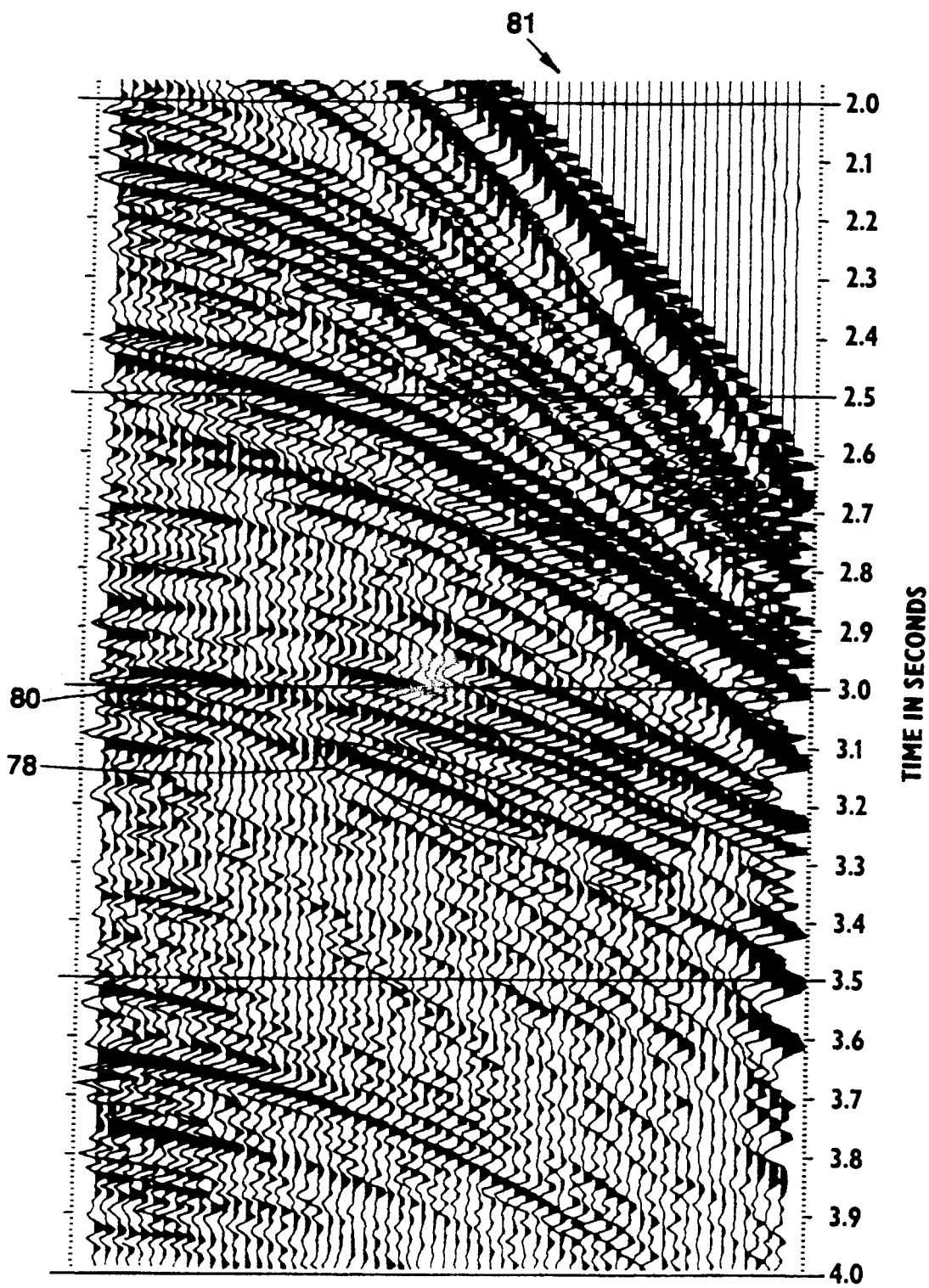
FIG. 9 illustrates a portion of the gather of FIG. 8.

FIG. 9 represents an enlarged view of a portion of the gather 81 of FIG. 8. As can be seen, the unwanted multiple energy 74 is virtually eliminated from the gather 81, while the primary reflections 78 and 80 remain substantially undisturbed. Thus, when the data of FIG. 8 is processed, it will produce a more accurate picture of the subterranean formation.

Tests suggest that the constrained cross-equalization technique exhibits very good results so long as the time shift component $\tau$ is small, i.e., less than half a wavelength of the highest frequency present.

We claim:

1. A method of cross-equalizing an electrical data trace signal produced by sensing an underwater land formation in an under-water environment and an electrical model trace signal determined from said data trace signal and from parameters of said underwater environment, each of said signals having respective amplitude, phase and time characteristics, said method comprising the steps of:

determining a ratio of said amplitude of said data trace signal and said amplitude of said model trace signal;

determining a phase difference between said phase of said data trace signal and said phase of said model trace signal;

determining a time delay between said time characteristic of said data trace signal and said time characteristic of said model trace signal;

designing a constrained filter using said ratio, phase difference and time delay; and filtering said model trace signal with said constrained filter to produce a cross-equalized model trace signal.

2. The method, as set forth in claim 1, wherein said steps of determining are accomplished by the steps of:

transforming said model trace signal into frequency-domain;

representing said data traces signal as a sum of: a real component of said model trace signal, an imaginary component of said model trace signal, a derivative component of said real component of said model trace signal, and a derivative component of said imaginary component of said model trace signal;

weighting each of said summed components by a respective weighting factor, said weighting factors embodying said amplitude ratio, phase difference and time delay between said model trace signal and said data trace signal; and solving for each of said weighting factors to determine said amplitude ratio, phase difference and time delay.

3. The method, as set forth in claim 1, wherein said constrained filter is represented by:

$$B\, e^{-i(\omega\tau + b)};$$

where B is said amplitude ratio, b is said phase difference, and $\tau$ is said time delay.

4. The method, as set forth in claim 1, wherein said step of filtering comprises the steps of:

transforming said model trace signal into frequency domain to produce a transformed model trace signal; and multiplying said transformed model trace signal by said constrained filter to produce said cross-equalized model trace signal.

5. A method of cross-equalizing an electrical data trace signal produced by sensing an underwater land formation in an underwater environment and an electrical model trace signal determined from said data trace signal and from parameters of said underwater environment, said method comprising the steps of:
  representing said data trace signal as a sum of: a real component of said model trace signal, an imaginary component of said model trace signal, a derivative component of said real component of said model trace signal, and a derivative component of said imaginary component of said model trace signal;
  weighting each of said summed components by a respective weighting factor, said weighting factors embodying amplitude, phase and time differences between said model trace signal and said data trace signal;
  solving for each of said weighting factors to determine said amplitude, phase and time differences;
  designing a constrained filter using said amplitude, phase and time differences; and
  filtering said model trace signal with said constrained filter to produce a crossequalized model trace signal.

6. The method, as set forth in claim 5, wherein said constrained filter is represented by:

$$B e^{-i(\omega \tau + b)};$$

where B is said amplitude difference, b is said phase difference, and $\tau$ is said time difference.

7. The method, as set forth in claim 6, wherein said step of filtering comprises the steps of:
  transforming said model trace signal into frequency domain to produce a transformed model trace signal; and
  multiplying said transformed model trace signal by said constrained filter to produce said cross-equalized model trace signal.

8. A method of cross-equalizing an electrical data trace signal produced by sensing an underwater land formation in an underwater environment and an electrical model trace signal determined from said data trace signal and from parameters of said underwater environment, said method comprising the steps of:
  determining a real component of said model trace signal, an imaginary component of said model trace signal, a derivative component of said real component of said model trace signal, and a derivative component of said imaginary component of said model trace signal;
  summing each of said components;
  weighting each of said summed components by a respective weighting factor, said weighting factors embodying amplitude, phase and time differences between said model trace signal and said data trace signal; and
  solving for each of said weighting factors to produce a cross-equalized model trace signal.

9. A method of removing undesirable data from an electrical data trace signal being produced by sensing an underwater land formation and having amplitude, phase and time characteristics, said method comprising the steps of:
  preparing an electrical model trace signal that estimates said undesirable data, said model trace signal having amplitude, phase and time characteristics;
  determining a ratio of said amplitude of said data trace signal and said amplitude of said model trace signal;
  determining a phase difference between said phase of said data trace signal and said phase of said model trace signal;
  determining a time delay between said time characteristic of said data trace signal and said time characteristic of said model trace signal;
  designing a constrained filter using said ratio, phase difference and time delay;
  filtering said model trace signal with said constrained filter to produce a new model trace signal; and
  subtracting said new model trace signal from said data trace signal to produce a data trace signal substantially free from said undesirable data.

10. The method, as set forth in claim 9, wherein said step of preparing is accomplished by:
  extrapolating said model trace signal using a wavefield extrapolation technique.

11. The method, as set forth in claim 9, further comprising the step of:
  isolating selected segments of said model trace signal, said isolated segments being correlative to said undesirable data.

12. The method, as set forth in claim 11, wherein said step of isolating is accomplished by:
  gating said model trace signal in the time-domain.

13. The method, as set forth in claim 9, wherein said steps of determining are accomplished by the steps of:
  transforming said model trace signal into the frequency-domain;
  representing said data trace signal as a sum of: a real component of said model trace signal, an imaginary component of said model trace signal, a derivative component of said real component of said model trace signal, and a derivative component of said imaginary component of said model trace signal;
  weighting each of said summed components by a respective weighting factor, said weighting factors embodying said amplitude ratio, phase difference and time delay between said model trace signal and said data trace signal; and
  solving for each of said weighting factors to determine said amplitude ratio, phase difference and time delay.

14. The method, as set forth in claim 9, wherein said constrained filter is represented by:

$$B e^{-i(\omega \tau + b)};$$

where B is said amplitude ratio, b is said phase difference, and $\tau$ is said time delay.

15. The method, as set forth in claim 9, wherein said step of filtering comprises the steps of:
  transforming said model trace signal into frequency domain to produce a transformed model trace signal; and
  multiplying said transformed model trace signal by said constrained filter to produce said new model trace signal.

16. The method, as set forth in claim 15, wherein said step of subtracting is accomplished by:
  transforming said new model trace signal into the time-domain to produce a transformed new model trace signal; and
  subtracting said transformed new model trace signal from said data trace signal in the time-domain.

17. A method of removing undesirable data from an electrical data trace signal being produced by sensing an underwater land formation and having amplitude, phase and time characteristics, said method comprising the steps of:
- preparing an electrical model trace signal that estimates said undesirable data, said model trace signal having amplitude, phase and time characteristics;
- representing said undesirable data as a sum of: a real component of said model trace signal, an imaginary component of said model trace signal, a derivative component of said real component of said model trace signal, and a derivative component of said imaginary component of said model trace signal;
- weighting each of said summed components by a respective weighting factor, said weighting factors embodying amplitude, phase and time differences between said model trace signal and said data trace signal;
- solving for each of said weighting factors to determine said amplitude, phase and time differences;
- designing a constrained filter using said amplitude, phase and time differences;
- filtering said model trace signal with said constrained filter to produce a new model trace signal; and
- subtracting said new model trace signal from said data trace signal to produce a data trace signal substantially free from said undesirable data.

18. The method, as set forth in claim 17, wherein said step of preparing is accomplished by:
- extrapolating said model trace signal using a wavefield extrapolation technique.

19. The method, as set forth in claim 17, further comprising the step of:
- isolating selected segments of said model trace signal, said isolated segments being correlative to said undesirable data.

20. The method, as set forth in claim 19, wherein said step of isolating is accomplished by:
- gating said model trace signal in the time-domain.

21. The method, as set forth in claim 17, wherein said constrained filter is represented by:

$$B\ e^{-i(\omega\tau+b)};$$

where B is said amplitude difference, b is said phase difference, and $\tau$ is said time difference.

22. The method, as set forth in claim 17, wherein said step of filtering comprises the steps of:

transforming said model trace signal into frequency domain to produce a transformed model trace signal; and
multiplying said transformed model trace signal by said constrained filter.

23. The method, as set forth in claim 22, wherein said step of subtracting is accomplished by:
- transforming said new model trace signal into the time-domain to produce a transformed new model trace signal; and
- subtracting said transformed new model trace signal from said data trace signal in the time-domain.

24. A method of removing undesirable data from an electrical data trace signal being produced by sensing an underwater and formation and having amplitude, phase and time characteristics, said method comprising the steps of:
- preparing an electrical model trace signal that estimates said undesirable data, said model trace signal having amplitude, phase and time characteristics;
- determining a real component of said model trace signal, an imaginary component of said model trace signal, a derivative component of said real component of said model trace signal, and a derivative component of said imaginary component of said model trace signal;
- summing each of said components;
- weighting each of said summed components by a respective weighting factor, said weighting factors embodying amplitude, phase and time differences between said model trace signal and said data trace signal;
- solving for each of said weighting factors to produce a cross-equalized model trace signal; and
- subtracting said cross-equalized model trace signal from said data trace signal to produce a data trace signal substantially free from said undesirable data.

25. A method of cross-equalizing one electrical data trace signal with another electrical data trace signal, said another data trace signal being produced by sensing an underwater land formation, said method comprising:
- modeling said one data trace signal as a sum of a real component, an imaginary component, a derivative of said real component, and a derivative of said imaginary component of said another data trace signal, wherein each of said components is multiplied by a respective weighting factor and wherein said weighting factors represent an amplitude, phase and time difference between said one data trace signal and said another data trace signal;
- solving for said weighting factors to determine said amplitude, phase and time difference to produce a cross-equalized data trace signal.

* * * * *

UNITED STATES PATENT AND TRADEMARK OFFICE
CERTIFICATE OF CORRECTION

PATENT NO. : 5,309,360

DATED : May 3, 1994

INVENTOR(S) : David J. Monk and Cameron B. Wason

It is certified that error appears in the above-indentified patent and that said Letters Patent is hereby corrected as shown below:

Column 6, line 11, "1" should be --14--.

Column 6, line 18, delete "15".

Column 7, line 27, "$D(t) = B \int d\omega\, A(\omega)\, \exp i\, (\omega(t+t) +b)$" should be
--$D(t) = B \int d\omega\, A(\omega)\, \exp i\, (\omega(t+\tau) +b)$--.

Column 7, line 43, "$D(t) = W_1 M(t) + W_2 M^1(t) + W_3 \hat{M}(t) + W_4 \hat{M}\,'(t)$" should be
--$D(t) = B\cos(b)(M(t) + \tau M'(t)) + B\sin(b)(\hat{M}(t) + \tau \hat{M}\,'(t))$--.

Column 7, line 58, "$D(t) = W_1 M(t) + W_2 M^1(t) + W_3 \hat{M}(t) + W_4 \hat{M}\,'(t)$" should be
--$D(t) = W_1 M(t) + W_2 M'(t) + W_3 \hat{M}(t) + W_4 \hat{M}\,'(t)$--.

Column 8, line 15, "$B\, e^{-j(\omega\tau + b)}$" should be --$B\, e^{-i(\omega\tau + b)}$--.

Column 8, line 66, "$M^5$" should be --$M^T$--.

UNITED STATES PATENT AND TRADEMARK OFFICE
CERTIFICATE OF CORRECTION

PATENT NO. : 5,309,360
DATED : May 3, 1994
INVENTOR(S) : David J. Monk and Cameron B. Wason It is certified that error appears in the above-indentified patent and that said Letters Patent is hereby corrected as shown below:

Column 9, line 20, "$a_6 = \sum_{t=0}^{NT} M'(t) \cdot M'(t)$" should be

--$a_6 = \sum_{t=0}^{NT} M'(t) \cdot \hat{M}'(t)$--.

Column 9, line 23, "$a_8 = \sum_{t=0}^{NT} M(t) \cdot \hat{M}'(t)$" should be

--$a_8 = \sum_{t=0}^{NT} \hat{M}(t) \cdot \hat{M}'(t)$--.

Column 9, line 30, "mode ltrace" should be --model trace--.

Column 9, line 48, "zuto-correlation" should be --auto correlation--.

Column 10, line 20, "$g(t) \cdot h(t) = \omega(a+ib)\exp(i\omega t)(c-id)\exp(i\omega t)$" should be --$g(t) \cdot h(t) = \int (a+ib)\exp(i\omega t)(c-id)\exp(i\omega t)$--.

UNITED STATES PATENT AND TRADEMARK OFFICE
CERTIFICATE OF CORRECTION

PATENT NO. : 5,309,360
DATED : May 3, 1994
INVENTOR(S) : David J. Monk and Cameron B. Wason It is certified that error appears in the above-indentified patent and that said Letters Patent is hereby corrected as shown below:

Column 10, line 50, "$M^1(t) = i \int \omega M(f)\exp(i\omega t) = \int \omega(-b+ia)$" should be --$M'(t) = i \int \omega M(f)\exp(i\omega t) = \int \omega(-b+ia)$--.

Column 10, line 52, "$M(t) = i \int \omega M(f)\exp(i\omega t) = \int -b+ia$" should be --$M^\wedge(t) = i \int \omega M(f)\exp(i\omega t) = \int -b+ia$--.

Column 10, line 54, "$M(t) = - \int \omega M(f)\exp(i\omega t) = - \int \omega(a+ib)$" should be --$M^{\wedge\prime}(t) = - \int \omega M(f)\exp(i\omega t) = - \int \omega(a+ib)$--.

Signed and Sealed this

Eleventh Day of October, 1994

Attest:

BRUCE LEHMAN

*Attesting Officer*  *Commissioner of Patents and Trademarks*